June 21, 1966 R. E. WILLIAMS 3,257,495
VIBRATO SYSTEMS
Filed Jan. 31, 1962
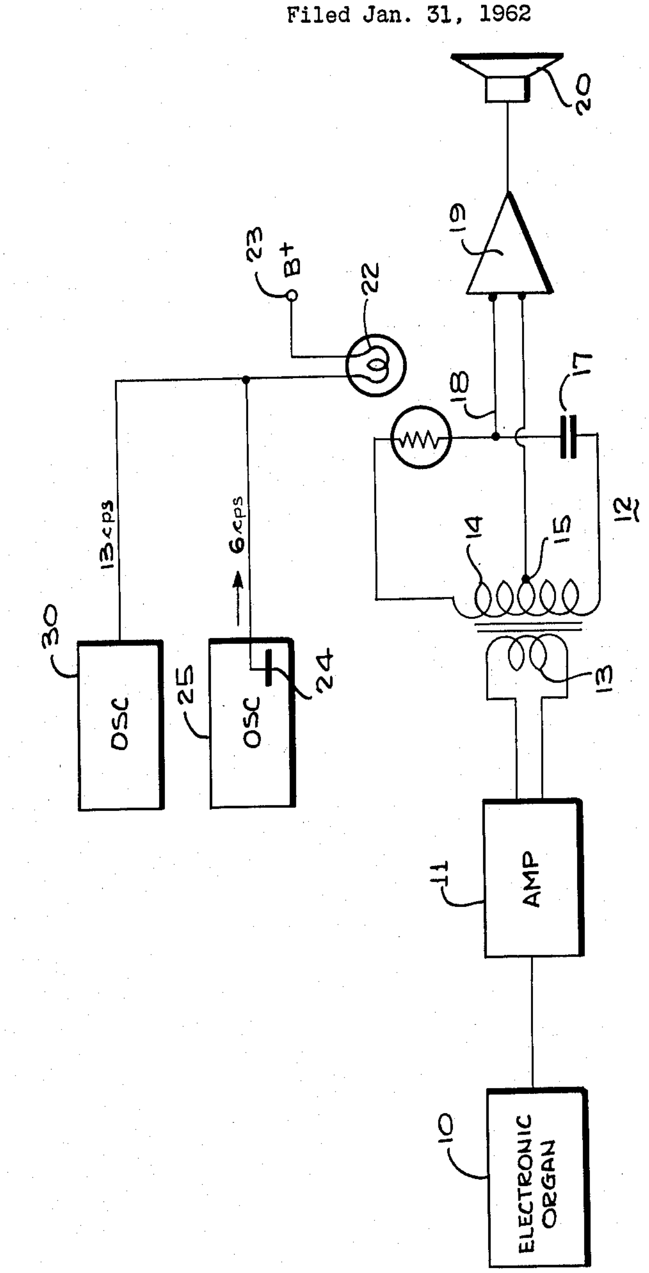
INVENTOR
RICHARD WILLIAMS
BY Hurvitz and Rose
ATTORNEYS United States Patent Office
3,257,495
Patented June 21, 1966

3,257,495
VIBRATO SYSTEMS

Richard E. Williams, Fairfax, Va., assignor to Scope, Incorporated, Falls Church, Va., a corporation of New Hampshire Filed Jan. 31, 1962, Ser. No. 170,146
2 Claims. (Cl. 84—1.25)

The present invention relates generally to vibrato systems for electronic organs or other sources of electronic music, and more particularly to vibrato systems employing bridge circuits as phase modulators, the bridge circuits employing light sensitive resistances as phase shifting circuit elements.

It is known to utilize a phase modulator in an audio channel, in order to introduce frequency modulation into a wide band audio signal, such as derives, for example, from an electronic organ. Such systems usually utilize vacuum tubes or transistors as the variable element of the phase modulator, and the tubes or transistors may be connected as a variable resistance or as a variable capacitance, operating against a fixed capacitance or fixed resistance, to introduce a variable phase shift. Such systems are relatively complex because of the problems which exist of bringing signals into and deriving signal from the active element and supplying D.C. operating voltages to the active element. The further difficulty arises that the range of capacities or resistances which can be linearly generated by means of a vacuum tube or transistor circuit is limited, so that linear phase shifts which can be generated, particularly in the low frequency range, is relatively slight. Frequency shifts generated by a phase shift modulator are proportional to rate of change of phase, so that only slight frequency-vibrato modulations can be generated. Additionally, it proves difficult to generate pure frequency modulation, i.e. without concommitant amplitude modulation, when utilizing active circuit elements.

It is a feature of the present invention to provide a system for generating frequency vibrato modulation of a wide band audio signal by means of a phase modulator bridge employing only passive circuit elements.

It is a further feature of the invention to provide a system of phase modulation employing a bridge having a fixed capacitive arm and a further arm comprising a photo-resistor capable of resistance variation over the range approximately zero to infinity; supplying modulating signal by means of an amplitude varying light source.

It has been found that vibrato effect, whether produced by means of the present system or otherwise, can be considerably enhanced by increasing its complexity, and more particularly by superposing on the normal vibrato frequency a supplementary frequency in the range 10–18 c.p.s. This result may be readily accomplished in phase shift vibrato systems by providing two vibrato modulation sources in parallel, one at 6–7 c.p.s. and the other at 10–18 c.p.s. and of smaller amplitude. To this end two oscillators of appropriate frequencies may be connected in parallel to modulate current flow to a lamp which illuminates the photo-resistor of the bridge above referred to.

It is, accordingly, a further object of the present invention to provide a system of enhancing vibrato effects by superposing on the normal sinusoidal vibrato modulation signal at 6–7 c.p.s., a higher frequency component in the range 10–18 c.p.s.

The above and still further objects, features and advantages of the present invention will become apparent upon consideration of the following detailed description of one specific embodiment thereof, especially when taken in conjunction with the accompanying drawing, wherein:

The single figure is a circuit diagram partly in block and partly schematic, of a preferred form of the invention.

Referring now to the accompanying drawings, the reference numeral 10 denotes a wide band audio source such as an electronic organ or other electrical musical instrument. The audio band provided by the source 10 is amplified in an amplifier 11, wihch provides a convenient signal level and matches impedances into a phase modulator bridge circuit 12.

The bridge circuit 12 includes a primary winding 13 connected to amplifier 11, as its output, and a push-pull secondary winding 14 having a mid tap 15. Across the secondary winding 14 is connected in series a variable photo-sensitive resistance 16 and a fixed capacitance 17. The junction 18 of the latter elements and the mid tap 15 are coupled via a power amplifier 19 to speaker 20.

In proximity to photo-sensitive resistance 16 is provided a lamp 22 connected in series with a B+ terminal 23 to an anode 24 of a phase shift oscillator 25. The latter is designed to oscillate at about 6 or 7 c.p.s., as a suitable vibrato frequency. As the oscillator 25 oscillates the anode current to anode 24 periodically increases and decreases, from zero or around zero to some predetermined value. The oscillations may be sinusoidal. Accordingly, sinusoidal current flows in lamp 22 and the luminous output of lamp 22 varies sinusoidally from zero to a predetermined value, at vibrato frequency.

As the luminous output of lamp 22 varies sinusoidally so does the resistance of photo-resistor 16 vary sinusoidally between values from near zero to many megohms. In consequence, the phase of audio current between terminals 18 and 15 varies over a wide range, which applies to the entire audio input band.

In general, the amplifier 19 may be single ended, in which case mid-tap 15 may be grounded. The connections illustrated are more general, and indicate that mid-tap 15 may be connected to other than a ground point in amplifier 19.

Enhanced vibrato effects may be produced by connecting in parallel with oscillator 25, a further oscillator 30, operating at say 13 c.p.s., although any frequency in the range 10–18 c.p.s. can be employed. It is desirable musically that the oscillators 25 and 30 not be harmonically related in frequency.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. In a vibrato system, a source of wide band audio signal, a phase modulator for said band, means connecting said phase modulator in cascade with said source, said phase modulator including a center tapped transformer winding, a photo-resistance and a phase shift capacitor for said band, means connecting said photo-resistance and said capacitor in series with each other across said winding, an output circuit, means connecting said output circuit to the junction of said phase shift capacitor and said photo-resistance, a source of light including a filament located adjacent to said photo-resistance, and a source of vibrato oscillations including at least one oscillator, a source of D.C. voltage, and means connecting said filament in series with said oscillator and said source of D.C. voltage for providing a substantially sinusoidal, vibrato frequency varying D.C. voltage thereto, and wherein said source of vibrato oscillations generates two frequencies at approximately 7 c.p.s. and in the range of 10 to 18 c.p.s., respectively.

2. In a vibrato system, a source of wide band audio signal, a phase modulator for said band, means connecting said phase modulator in cascade with said source, said phase modulator including a pair of input terminals, a photo-resistance and a phase shift capacitor for said band, means connecting said photo-resistance and said capacitor in series between said input terminals, means for supplying opposite polarities of said audio signal to said input terminals, a source of light optically coupled to said photo-resistance, a source of vibrato oscillations for generating two frequencies, one of said two frequencies being 7 c.p.s. and the other of said two frequencies being in the range of 10 to 18 c.p.s., means for connecting said source of light for varying the intensity of the light deriving from said light source, said light source sinusoidally varying the resistance of said photo-resistance at the frequencies of said source of vibrato oscillations to thereby vary the impedance between said input terminals, an output terminal for said phase modulator being at the junction of said photo-resistance and said phase shift capacitor, whereby the voltage at said output terminal is a replica of the signal deriving from said audio signal source frequency modulated by said source of vibrato oscillations, an output circuit, and means connecting said output terminal to said output circuit whereby said output circuit is responsive to the voltage at said output terminal.

References Cited by the Examiner

UNITED STATES PATENTS

| | | | |
|---|---|---|---|
| 1,977,095 | 10/1934 | Spielman | 84—1.18 |
| 2,015,885 | 10/1935 | Dallenbach | 315—174 X |
| 2,219,676 | 10/1940 | Barber | 332—3 |
| 2,408,193 | 9/1946 | Beste | 328—155 |
| 2,414,475 | 1/1947 | Marchand. | |
| 2,551,802 | 5/1951 | Kreithen. | |
| 2,574,577 | 11/1951 | Martin et al. | 84—1.01 |
| 2,815,487 | 12/1957 | Kaufman | 332—3 |
| 2,946,252 | 7/1960 | Clark | 84—1.18 |
| 2,989,887 | 6/1961 | Markowitz | 84—1.24 |
| 3,146,292 | 8/1964 | Bonham | 84—1.25 |
| 3,160,694 | 12/1964 | Meinema | 84—1.12 |

JOHN W. HUCKERT, *Primary Examiner.*

GEORGE N. WESTBY, *Examiner.*

E. DREYFUS, D. D. FORRER, *Assistant Examiners.*